C. CHRISTENSEN.
AGRICULTURAL IMPLEMENT.
APPLICATION FILED SEPT. 25, 1907.
1,074,310.
Patented Sept. 30, 1913.
2 SHEETS—SHEET 1.
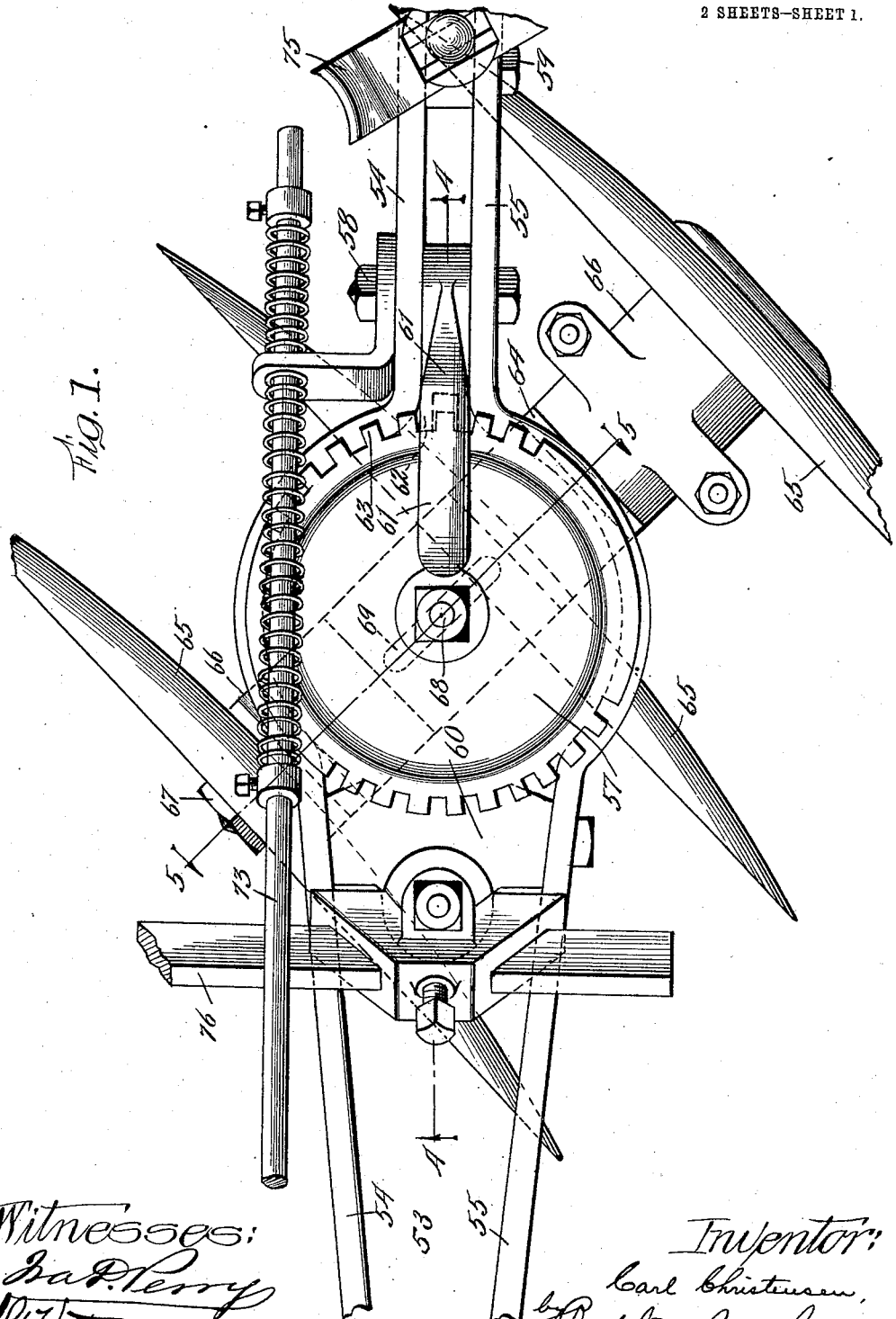

C. CHRISTENSEN.
AGRICULTURAL IMPLEMENT.
APPLICATION FILED SEPT. 25, 1907.
1,074,310.
Patented Sept. 30, 1913.
2 SHEETS—SHEET 2.
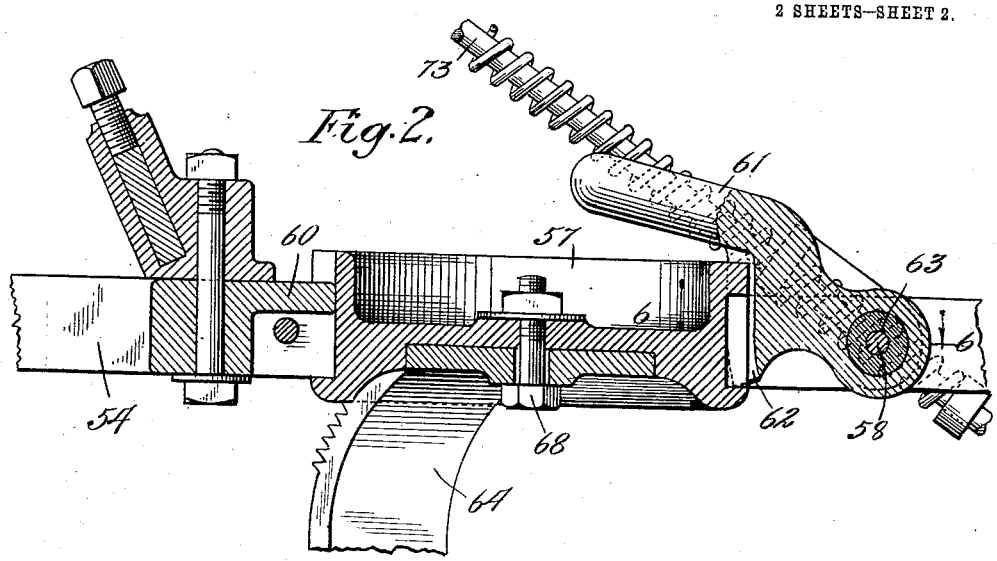
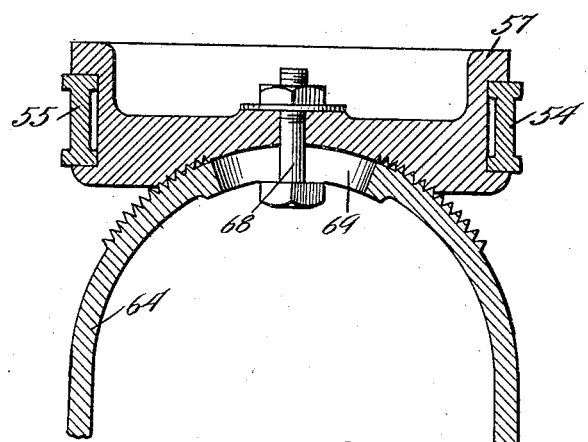
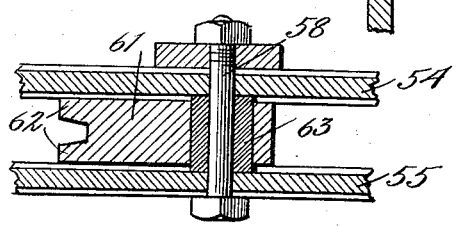
Witnesses:
Inventor:
Carl Christensen,

UNITED STATES PATENT OFFICE.

CARL CHRISTENSEN, OF BRADLEY, ILLINOIS, ASSIGNOR, BY MESNE ASSIGNMENTS, TO SEARS, ROEBUCK & COMPANY, OF CHICAGO, ILLINOIS, A CORPORATION OF NEW YORK.

AGRICULTURAL IMPLEMENT.

1,074,310.      Specification of Letters Patent.      Patented Sept. 30, 1913.

Application filed September 25, 1907. Serial No. 394,557.

*To all whom it may concern:*

Be it known that I, CARL CHRISTENSEN, a citizen of the United States, residing at Bradley, in the county of Kankakee and State of Illinois, have invented certain new and useful Improvements in Agricultural Implements, of which the following is a specification, reference being had to the accompanying drawings.

My invention relates to agricultural implements of the type illustrated and described in my pending application Serial No. 332,719, filed August 30, 1906, commonly known as "disk cultivators".

It has for its object to provide new and improved means for supporting the furrow-openers and securing them in different positions of adjustment. I accomplish this object as illustrated in the drawings and as hereinafter described.

What I regard as new is set forth in the claims.

In the drawings,—Figure 1 is an enlarged detail, illustrating the construction of one of the beams and adjacent parts; Fig. 2 is a partial section on line 4—4 of Fig. 1; Fig. 3 is a cross-section on line 5—5 of Fig. 1; and Fig. 4 is an enlarged detail, being a section on line 6—6 of Fig. 2.

Referring to the drawings,—53 indicates the beams, which carry the furrow-openers. As best shown in Fig. 1 each of said beams comprises two bars 54—55. The bars 54—55 diverge gently to a point near their rear ends, where they are oppositely curved to form a substantially circular frame adapted to receive and support a circular bearing-block 57, best shown in Fig. 1. Farther back the bars 54—55 again approach each other, being substantially parallel, and are secured together by bolts 58—59. As best shown in Fig. 3, the periphery of the bearing-block 57 is channeled to receive the bars 54—55 which fit in said channel, so that they serve to support said block without interfering with its rotation. The block 57 is locked against rotation both by a positive locking device and by clamping mechanism, which will now be described.

60 indicates a plate, which is secured between the bars 54—55 of the beam in front of and adjacent to the block 57, against the periphery of which it is adapted to bear, as best shown in Fig. 2.

61 indicates a dog pivotally mounted on the bolt 58 at the opposite side of the block 57, said dog having teeth 62 adapted to fit between a series of teeth 63 provided in the periphery of the block 57. That face of the dog 61 which forms the teeth 62 is tapered so that when said dog is forced down into engagement with the block 57 it acts to force said block over against the plate 60, thereby tightly clamping said block in position as well as positively locking it against rotation by reason of the intermeshing of the teeth of the dog with those of the block 57. The block 57 is therefore held in position with the utmost firmness and rigidity, but may readily be released by simply lifting the dog 61 out of operative position. As shown in Fig. 4, the dog 61 is provided with a bushing 63 which takes the wear and may readily be renewed when necessary.

64 indicates a hanger, which carries the gang of disks 65, as shown in Fig. 3. Said hanger is substantially an inverted U, its free ends being secured to sleeves 66 in which is mounted a shaft 67 which carries the disks, its upper end being arranged to fit in a suitable channel or socket provided in the under side of the block 57, as shown in Figs. 2 and 3, and being secured thereto by a bolt 68. The outer surface of the upper portion of the hanger 64 is corrugated, as best shown in Fig. 3, which corrugations mesh with similar corrugations in the socket which receives said hanger, thus preventing slippage. The hanger is also provided with a slot 69 for the bolt 68 so that it may be adjusted to cause the disks to tilt more or less relatively to the ground. The hanger 64 being fitted in a channel or groove extending across the block 57 prevents lateral turning or twisting of the hanger and assists in holding it firmly in position.

73 indicates a connecting rod by which the rear end portion of the beam is supported from a suitable lifting lever (not shown), and 76 indicates one end of an arch employed to hold the disk gangs properly apart.

That which I claim as my invention, and desire to secure by Letters Patent, is,—

1. In an agricultural implement, the combination of a beam, a rotatable block carried by said beam, said block having a smooth peripheral bearing surface, a furrow-opener connected with said block, and means for clamping said block to frictionally engage and hold it against rotation and at the same time positively engage and lock it against rotation.

2. In an agricultural implement, the combination of a beam, a substantially circular rotatable block, a furrow-opener connected with said block, means rigid with the beam and forming a circular bearing for said block, and a dog pivotally mounted to swing about a substantially horizontal axis for locking said block against rotation.

3. In an agricultural implement, the combination of a beam having members spaced apart, a circular block adapted to fit between said members, said members having curved portions forming peripheral bearings for said block, a furrow-opener connected with said block, and a swinging dog for locking said block against rotation.

4. In an agricultural implement, the combination of a beam composed of members spaced apart having oppositely-curved portions between their ends, a circular block adapted to fit between the curved portions of said members, a furrow-opener connected with said block, and a swinging dog for locking said block non-rotatably to said beam.

5. In an agricultural implement, the combination of a beam composed of members spaced apart, said members having oppositely-curved portions between their ends, a block fitted between said oppositely-curved portions of the beam, a plate secured to the beam and adapted to engage the periphery of said block, means carried by the beam at the opposite side of the block and adapted to engage and clamp said block against said plate, and a furrow-opener connected to said block.

6. In an agricultural implement, the combination of a beam composed of members spaced apart, said members having oppositely-curved portions between their ends, a block fitted between said oppositely-curved portions of the beam, a plate secured to the beam and adapted to engage the periphery of said block, a swinging dog mounted on the beam and adapted to engage and clamp said block against said plate, and a furrow-opener connected to said block.

7. In an agricultural implement, the combination of a beam composed of members spaced apart, said members having oppositely-curved portions between their ends, a block fitted between said oppositely-curved portions of the beam, a plate secured to the beam and adapted to engage the periphery of said block, a swinging dog mounted on the beam and adapted to engage and clamp said block against said plate, and a furrow-opener connected to said block, said block having teeth adapted to be engaged by said dog.

8. In an agricultural implement, the combination of a beam composed of members spaced apart having oppositely-curved portions between their ends, a rotatable block fitted between said oppositely-curved portions, a furrow-opener connected with said block, said block having peripheral teeth, and a dog pivotally mounted on the beam and adapted to engage said teeth to lock the block against rotation.

9. In an agricultural implement, the combination of a beam composed of bars spaced apart intermediately, a rotatable block adapted to fit between said bars, said block having a peripheral channel to receive said bars, a furrow-opener connected with said block, and means carried by the beam for locking said block against rotation.

10. In an agricultural implement, the combination of a beam composed of members spaced apart intermediately, a rotatable block fitted in a substantially horizontal position between said members, said block having a groove at the underside thereof, means for locking said block against rotation, a standard curved at its upper end and adapted to fit in said groove, said curved portion being slotted, a bolt extending through said slot and through said block, and a furrow-opener carried by said standard.

11. In an agricultural implement, the combination of a beam comprising members spaced apart, a rotatable block fitted between and supported by said members, a standard connected with said block, a furrow-opener connected with said standard, and means for moving the block forcibly into frictional contact with the members of the beam and thereby securing it non-rotatably in position.

12. In an agricultural implement, the combination of a beam having members spaced apart, a rotatable block fitted between said members, said members forming peripheral bearings for said block, segmental teeth carried by said block, a dog connected with the beam and engaging said teeth for locking said block against rotation, and a furrow-opener connected with said block.

13. In an agricultural implement, the combination of a beam having members spaced apart, a rotatable block fitted between said members, said members forming peripheral bearings for said block, segmental teeth carried by said block, a dog pivotally supported by the beam to swing about a substantially horizontal axis and adapted to engage said teeth for locking the block against rotation, and a furrow-opener connected with said block.

14. In an agricultural implement, the combination of a beam having members spaced apart, a rotatable block fitted between said members, said members forming peripheral bearings for said block, marginal teeth carried by said block, a dog connected with the beam and engaging said teeth for locking said block against rotation, and a furrow-opener connected with said block.

15. In an agricultural implement, the combination of a beam having members spaced apart, a rotatable block fitted between said members, said members forming peripheral bearings for said block, marginal teeth carried by said block, a dog pivotally supported by the beam to swing about a substantially horizontal axis and adapted to engage said teeth for locking the block against rotation, and a furrow-opener connected with said block.

16. In an agricultural implement, the combination of a beam having members spaced apart, a circular block having a peripheral channel, said block being adapted to fit between said members, a furrow-opener connected with said block, and a dog pivoted to swing about a substantially horizontal axis and acting to lock said block against rotation.

17. In an agricultural implement, the combination of a beam having members spaced apart, a circular block having a peripheral channel, said block being adapted to fit between said members, a furrow-opener connected with said block, said block having segmental teeth in its upper side, and a dog pivotally supported by the beam and adapted to swing into engagement with said teeth to lock the block against rotation.

CARL CHRISTENSEN.

Witnesses:
A. SATER,
N. A. KNIEF.

---

Copies of this patent may be obtained for five cents each, by addressing the "Commissioner of Patents, Washington, D. C."